United States Patent

Southworth

[15] 3,683,111

[45] Aug. 8, 1972

[54] TELEVISION BANDWIDTH COMPRESSION AND EXPANSION SYSTEM

[72] Inventor: Glen R. Southworth, Boulder, Colo.

[73] Assignee: Colorado Video, Incorporated, Boulder, Colo.

[22] Filed: June 18, 1969

[21] Appl. No.: 834,308

[52] U.S. Cl............178/6, 178/DIG. 33, 178/DIG. 3, 340/221, 340/276

[51] Int. Cl..........H04n 7/18, H04n 7/12, H04n 7/02, G08b 13/22

[58] Field of Search..........178/5.4 CD, 5.2, DIG. 3, 178/DIG. 1, 5.4 ST, 5.4 C, 7.1; 340/221, 258 R, 276

[56] References Cited

UNITED STATES PATENTS

| | | | |
|---|---|---|---|
| 3,114,797 | 12/1963 | Williams | 178/DIG. 1 |
| 3,284,567 | 11/1966 | Southworth | 178/DIG. 3 |
| 2,657,255 | 10/1953 | Wintringham | 178/5.4 C |
| 2,681,946 | 6/1954 | Leverenz | 178/5.4 CF |
| 2,736,762 | 2/1956 | Kell | 178/5.4 CD |
| 2,955,159 | 10/1960 | Jones | 178/DIG. 3 |
| 3,470,313 | 9/1969 | Bockwoldt | 178/6 |
| 3,499,980 | 3/1970 | Smierciak | 178/DIG. 3 |
| 3,507,992 | 4/1970 | Foote | 178/DIG. 33 |
| 3,524,012 | 8/1970 | Kihara | 178/5.4 CD |
| 3,526,900 | 9/1970 | McCoy | 178/6.6 A |
| 3,531,588 | 9/1970 | Kartcotner | 178/DIG. 33 |

FOREIGN PATENTS OR APPLICATIONS

| | | | |
|---|---|---|---|
| 997,946 | 7/1965 | Great Britain | 178/DIG. 33 |

*Primary Examiner*—Robert L. Griffin
*Assistant Examiner*—John C. Martin
*Attorney*—Duane C. Burton

[57] ABSTRACT

A television scan converter system converting a television signal to a narrow bandwidth by high order sampling techniques which may scramble the signals, and then converting the narrow bandwidth television signals to hard copy or a standard television signal. The system may include color transmission and utilizes components which may include a rotating magnetic disc memory, counters, and gating techniques in some embodiments with techniques allowing easy detection of moving objects in surveillance television.

13 Claims, 15 Drawing Figures

INVENTOR

GLEN R. SOUTHWORTH

BY Sheridan, Ross and Burton
ATTORNEYS

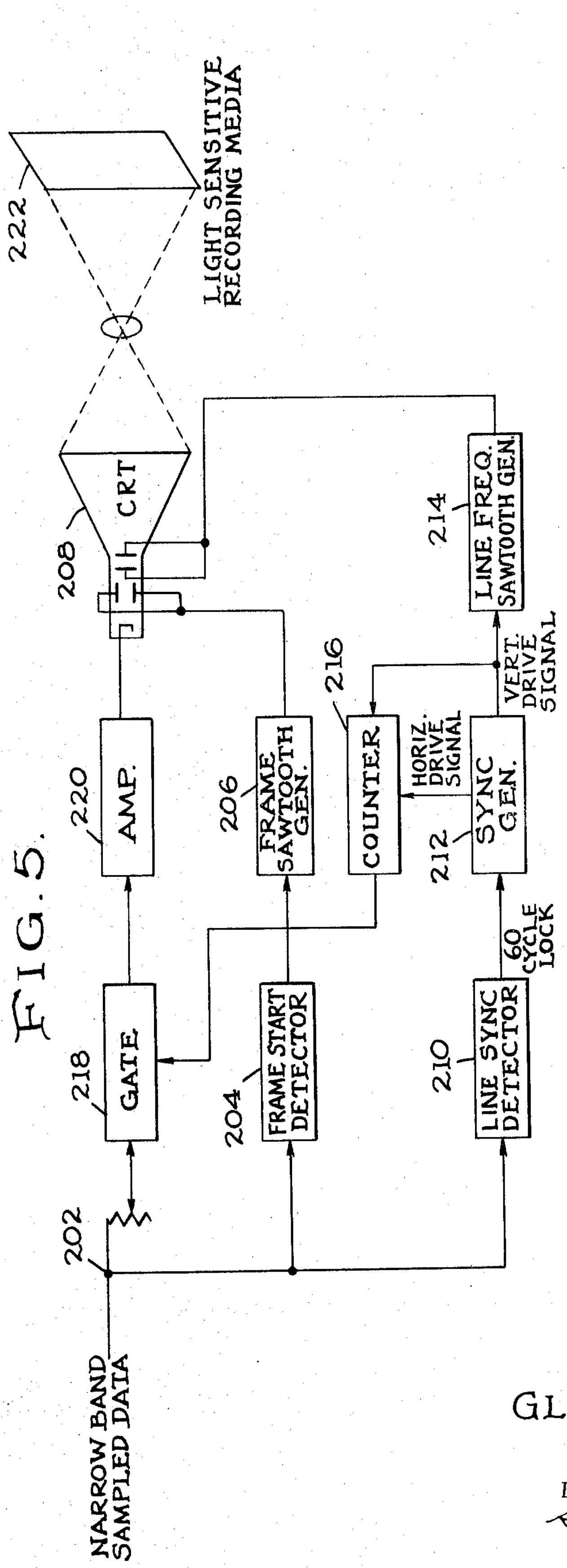
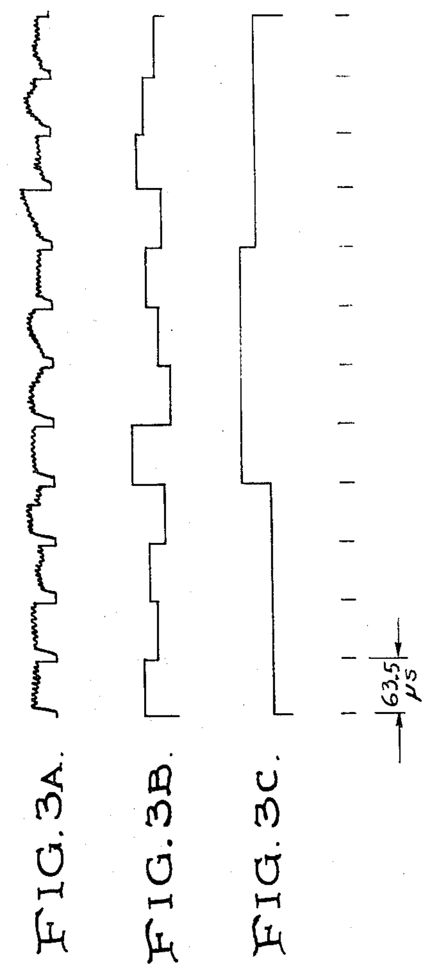
FIG. 3A. FIG. 3B. FIG. 3C.
INVENTOR
GLEN R. SOUTHWORTH
BY Sheridan, Ross and Burton
ATTORNEYS

INVENTOR

GLEN R. SOUTHWORTH

BY *Sheridan, Ross and Burton*

ATTORNEYS

INVENTOR

GLEN R. SOUTHWORTH

BY Sheridan, Ross and Burton
ATTORNEYS

INVENTOR
GLEN R. SOUTHWORTH

BY Sheridan, Ross and Burton
ATTORNEYS

INVENTOR
GLEN R. SOUTHWORTH
BY Sheridan, Ross and Burton
ATTORNEYS

TELEVISION BANDWIDTH COMPRESSION AND EXPANSION SYSTEM

BACKGROUND OF THE INVENTION

The present invention relates to a system which accepts standard broad-band television signals, reduces the information content of said broad-band signals to a range of audio frequencies and subsequently provides means of reconverting this narrow band signal back to standard television rates or hard copy.

SUMMARY OF THE INVENTION

It is an object of the present invention to disclose equipment and techniques for accepting wide band television signals at either standard or non-standard rates and reducing the bandwidth of said signals to an audio frequency range or narrow bandwidth without requiring modification of the video signal input source.

It is also an object of the present invention to obtain a bandwidth compression which can be variable to match the requirements involving the bandwidth of a transmission media versus length of time required for transmission of a single image.

It is a further object of the present invention to provide means of concurrently scrambling the narrow band video signal to assist in the prevention of unauthorized reception.

Furthermore, it is an object of the present invention to provide for the conversion of the narrow band video signal back to real time standard television signals for subsequent viewing on conventional television monitors, video tape-recording, or the performance of other operations suitable to standard television formats.

Additional objects of the present invention are to provide means of reproducing narrow band video signals as hard copy and to provide means of simple transmission and reproduction of still color images, and to provide for the detection of motion or other changes in transmitted images.

Accordingly, the present invention changes a wide band television signal into a narrow band video output utilizing counter and gating components in some embodiments, with sampling techniques and with or without scrambling of the signal. The narrow band signal is then of such bandwidth as to allow transmission over telephone lines instead of coaxial lines required in some prior art. Conversion of the narrow band signal is then made to hard copy or to real time video signals with embodiments which use components such as counters in the bandwidth compression equipment, and magnetic memory discs.

Where the terms "real time" and "wide band" are used herein, they are intended to refer to a rate, signal, or frequency which not only includes the values used in American standard broadcasting practice, but also to such rates, signals, and frequencies which are relatively high when compared to the corresponding rates, signals or frequencies characteristic of the "slow scan," "narrow band," or "sampled" output. Therefore it should be understood that the invention is not intended to be limited to any fixed range of operating rates, but presupposes a relative difference between the "wide band" and "narrow band" signals which will be determined by the particular application of the invention.

BRIEF DESCRIPTION OF THE DRAWINGS

Embodiments of the invention are described in detail with reference to the accompanying drawings wherein:

FIGS. 3A, 3B, and 3C illustrate some waveforms produced in the transmitting scan converter;

FIG. 5 is a block diagram of a receiving converter which can be used to generate hard copy;

DESCRIPTION OF THE PREFERRED EMBODIMENTS

Figure 1:
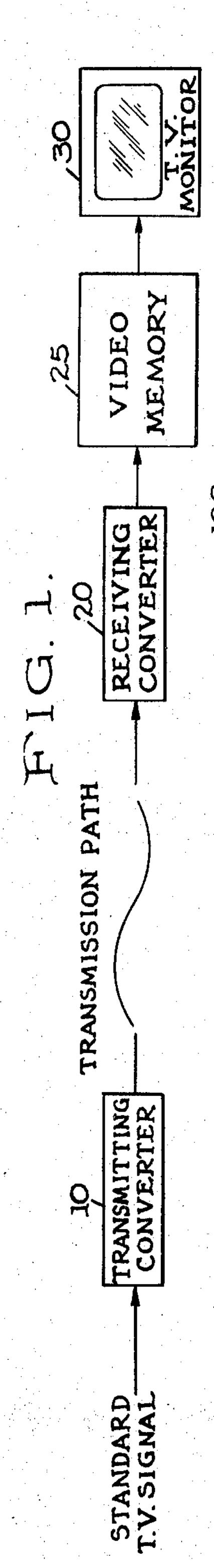
FIG. 1 is a block diagram showing an embodiment of an overall television scan converter system of the present invention.

In FIG. 1 there is shown a television scan converter system with a composite or standard television video signal applied to the input of a transmitting scan converter 10. The signal therein is changed to a narrow band video output which is transmitted over a link, which with the present invention may be audio lines such as telephone lines. Instead of expensive, leased coaxial lines which have been required in the transmission of a rather complex signal, the present system can operate satisfactorily using conventional telephone lines for carrying the signal over its transmission path. The signal used can be varied over a relatively large range such as ½, 1,2, and 4 kHz. This narrow band signal is picked up and passed through a receiving scan converter 20 which operates in conjunction with a video memory 25 to apply a real time video signal to a television viewer 30.

Figure 2:
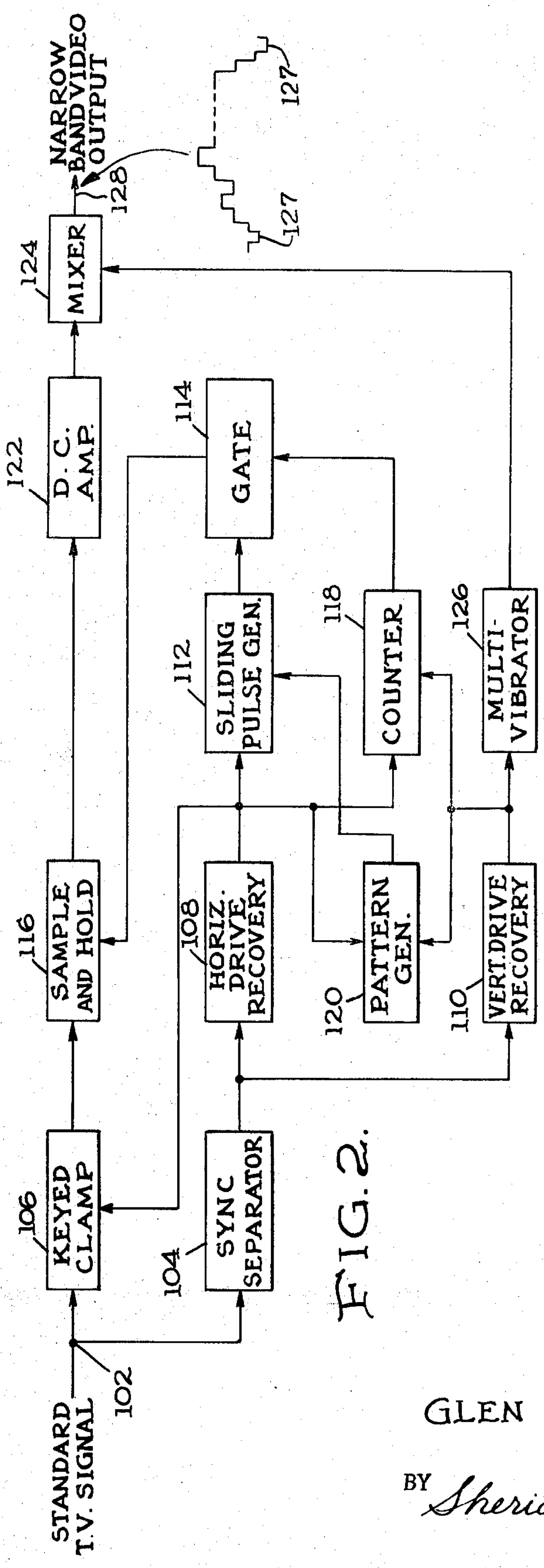
FIG. 2 is a block diagram showing one form of the transmitting bandwidth converter of the present invention referred to in FIG. 1.

One embodiment of a transmitting scan converter 10 is shown in FIG. 2. In this illustration a real time or standard television signal is applied at input 102 being applied both to a synchronizing signal separating circuit 104 and a keyed clamping circuit 106.

In synchronizing signal separating circuit 104 an output of negative going sync tips are cleared through a Schmitt trigger and actuate both a horizontal drive recovery circuit 108 and a vertical drive recovery circuit 110. Horizontal timing information from horizontal drive recovery circuit 108 is used to drive keyed clamping circuit 106 in the video circuitry which restores the DC component to the real time video signal. This horizontal timing information is also applied to clamping circuitry in sliding pulse generator 112 which grounds a constant current source therein for linearly charging a capacitor in intervals between the horizontal timing synchronizing pulses in order to generate a sawtooth waveform having a period the same as the line rate of the real time television signal. Also produced in sliding pulse generator 112 is a low-frequency sawtooth signal which produces frame scanning and when mixed with the other sawtooth waveform produced therein forms a square wave at television line rate with a trailing edge varying in time or "sliding" in accordance with the instantaneous value of the low frequency sawtooth signal. A sliding pulse generator of this type is shown in block form in my U.S. Pat. No. 3,284,567 issued Nov. 8, 1966 and is discussed with circuit diagrams given on page 66 in the April 1958 issue of *Radio and TV News* with attention directed to the schematic circuit shown on page 67. Also on page 99 in the Feb. 1966 issue of the *Journal of the Society of Motion Picture and Television Engineers* is an article wherein is shown the concept of a sliding pulse generator in FIG. 13 on page 101. This output after being differentiated, inverted, and amplified, drives gating circuit 114 which actuates sample and hold circuit 116. Horizontal drive pulses form horizontal drive recovery circuit 108 are also applied to counter 118 which by a simple logic configuration provides for further bandwidth compression by means of deleting sample pulses. The counter 118 may be set to delete every alternate pulse appearing at the output of sliding pulse generator 112 through operation of gating circuit 114, or may be used to delete three out of four pulses, seven out of eight pulses, or any other desired relationship. The consequence of deleting pulses from the output of sliding pulse generator 112 is to reduce the sampling rate of sample and hold circuit 116. If the action of gating circuit 114 in conjunction with counter 118 was not present, 15,750 samples per second would be taken with a standard American 525 line television signal input. Reducing the number of samples correspondingly reduces the bandwidth of the video data in the output of sample and hold circuit 116.

Some waveforms involved in the sampling process are shown in FIGS. 3A, 3B, and 3C. The waveform of the real time video shown in FIG. 3A illustrates individual lines of 63.5 μs duration. FIG. 3B illustrates the output of sample and hold circuit 116 if one sample is taken for each line of television. When one sample is taken for every fourth line of television the waveform is depicted in FIG. 3C.

Figure 4A:
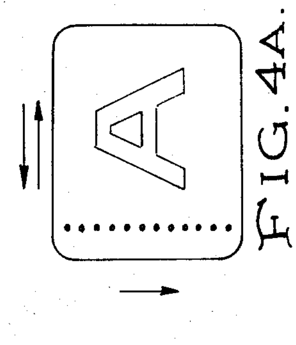
FIGS. 4A, 4B and 4C illustrate forms of sampling patterns usable with the present invention.
Figure 4B:
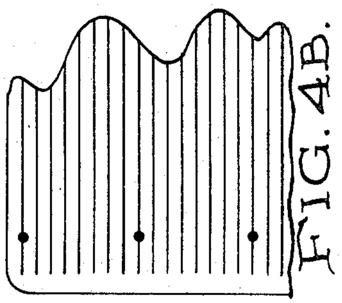

In the simplest implementation the output of sliding pulse generator 112 consists of a vertical row of sample pulses as indicated in FIG. 4A, which are "moved" at the desired rate either from left to right, or from right to left on the television raster. Normal 525 line television standards call for an interlaced signal pattern, with 262½ lines of information occurring in one field and an alternate 262½ lines of information occurring during the second field. This pattern is advantageous in connection with this invention, for if the counter circuit is set up in a binary fashion so as to divide by 2, 4, 8, 16, etc., then the timing natures of the input signal will cause the gated samples to move through the real time data as shown in FIG. 4B, thus allowing all of the original information in the real time image to be recovered by means of the sampling process. FIG. 4B shows only one field of interlaced television signal with one sample taken every eighth television line. If the input signal is not interlaced, then the sampling pattern remains "stationary" and vertical information is lost unless the logic in the counter circuits is rearranged to compensate for this condition. When one sample is taken for every television line (15,750 samples per second for U.S. standard television) an output bandwidth of the transmission scan converter of 8 kHz is obtained. A sample every other television line produces an output bandwidth of 4 kHz, a sample every fourth line produces a 2 kHz bandwidth, a sample every eighth line produces a 1 kHz bandwidth, and a sample every sixteenth line produces a 500 Hertz bandwidth output signal.

Figure 4C:
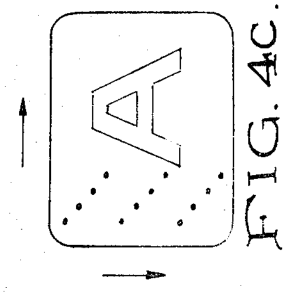

It is practical to change the sampling structure either to partially "scramble" the video output, or for other purposes, such as security, by use of the output of pattern generator 120 fed to sliding pulse generator 112 to horizontally displace the dot structure as desired and as indicated in FIG. 4C. The pattern generator 120 can be synchronized by the horizontal and vertical drive pulses from horizontal drive recovery circuit 108 and vertical drive recovery circuit 110 respectively.

The output of sample and hold circuit 116 feeds through non-inverting D.C. amplifier 122 to mixer 124 which also receives output pulses at the vertical drive rate from vertical drive recovery circuit 110 through a one-shot delay multivibrator 126 to form the narrow band video output with vertical synchronizing pulses 127 of the transmitting scan converter at point 128.

FIG. 5 illustrates in block diagram form one embodiment for recovering the narrow band video signal having been transmitted over some transmission path such as telephone lines, or other circuit, radio or microwave link, to a receiving terminal. In this embodiment the receiver scan converter may be used with photochromic or similar materials for direct viewing of images or for the reproduction of "hard copy."

In FIG. 5 the narrow band sampled video signal is applied to three circuits simultaneously. This signal at point 202 is fed to frame start detector circuit 204 which initiates a low frequency sawtooth generator 206 providing deflection on one axis of cathode ray tube 208. The narrow band video input signal at point 202 is also applied to line synchronization detector circuit 210 which detects synchronizing pulses occurring at the beginning of each line of narrow band video. These pulses are then used to phase-lock a television synchronizing generator 212 having horizontal and vertical drive signal outputs. The vertical drive signal is utilized to activate sawtooth generator 214 which produces a sawtooth waveform at line frequency which, in turn, provides scanning on another axis of cathode ray tube 208. The horizontal drive signals from synchronizing generator 212 are used to activate counter 216, which is identical to counter 118 of the transmitting scan converter, with the output of the counter 216 actuating gating circuit 218 which in turn passes only portions of the narrow band video input signal to amplifier 220 which in turn controls the brightness of the signal displayed on the face of cathode ray tube 208. The light output from the face of tube 208 may then be focused upon a light sensitive recording media 222 for translation and storage of images. In this manner a hard copy display is made. In this embodiment the counter-gate combination is included so as to produce a sharp clear picture and generate a coherent picture. A smeared image would most likely to produced if a counter was not used here.

Figure 6:
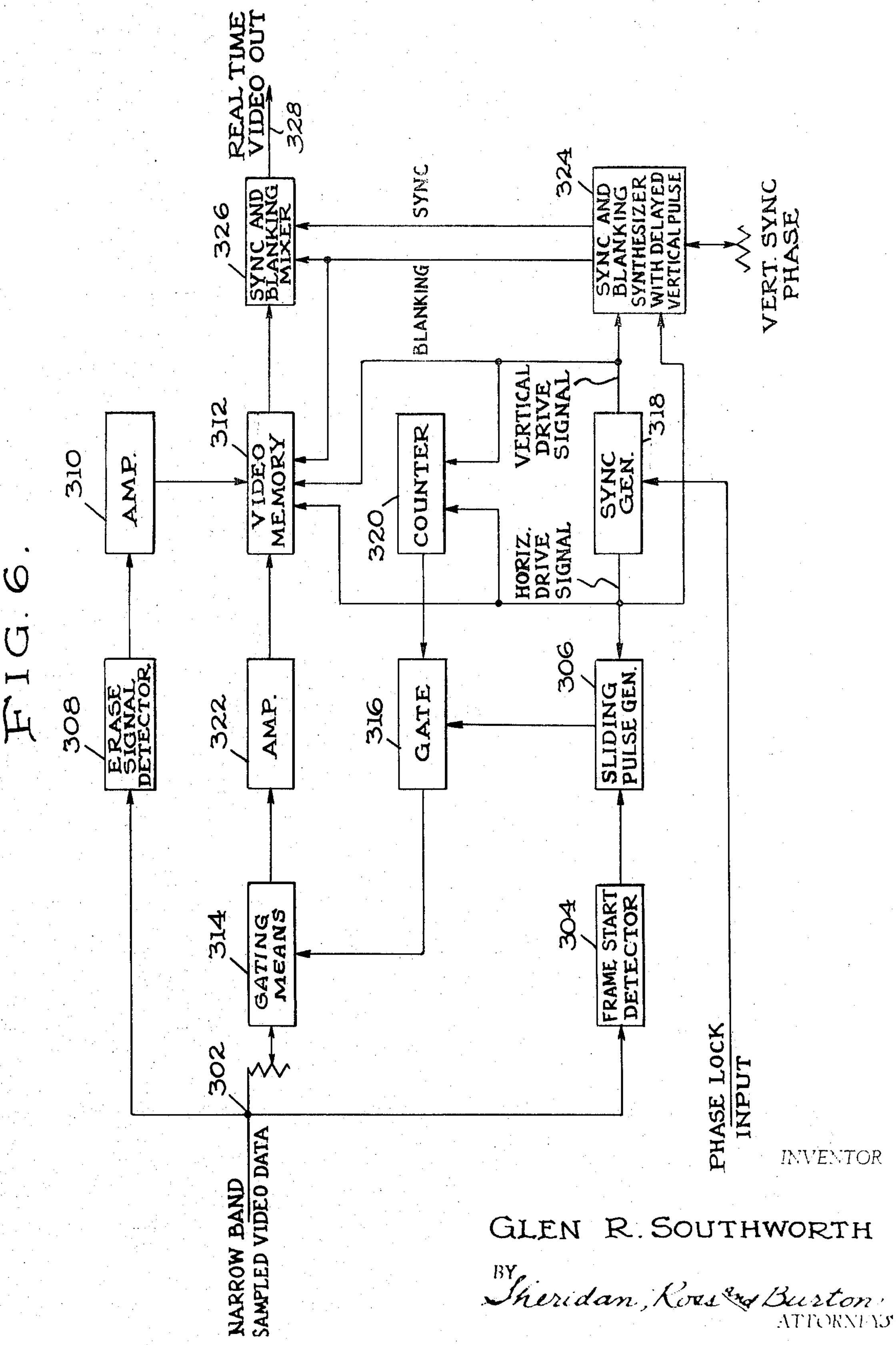
FIG. 6 is a block diagram of one embodiment of a receiving converter which can translate narrow band video signals to real time video signals.

FIG. 6 illustrates a different embodiment of the receiver scan converter with video memory for the reconversion of narrow band video signals to real time video signals. In this example, again the narrow band signal this time designated as an input at point 302, is applied to three separate circuits. The narrow band sampled video data signal is applied to frame start detector circuit 304 which actuates low frequency sliding pulse sawtooth generator 306. The narrow band signal is also applied to an erase signal detector circuit 308 which acting through amplifier 310 causes any prior information contained in video memory circuitry 312 to be deleted. Thirdly the narrow band signal is applied to gating means 314 which is driven by gated pulses from gating circuit 316 which pulses are obtained from sliding pulse sawtooth generator 306. In this embodiment a standard television synchronizing generator 318 is utilized to provide horizontal and vertical drive signals with synchronizing generator 318 phase locked to the narrow band input signal. The phase lock input may be derived either from information from the input signal or from the local 60 Hz power assuming that the originating source of the narrow band video is at the same frequency. Horizontal drive signals from synchronizing generator 318 are fed to sliding pulse generator 306 and at the same time to counter 320, which is identical to that used in the transmitting scan converter of the system. The output of counter 320 gates pulses from sliding pulse generator 306 in gating circuit 316 which gated pulses are applied to gating means circuit 314. The gated pulses applied to gating means 314 may be very narrow, typically on the order of 50–100 nanoseconds, with the output of gating means 314 being amplified in amplifier circuit 322 and applied to the recording circuits of video memory circuitry 312. Video memory circuitry 312 may include a storage scan conversion tube or other device. A specific advantage of this implementation is that the video memory may be "scanned" at normal television rates for readout purposes while incoming narrow band data is being simultaneously recorded. Horizontal and vertical drive signals are also applied to a synchronizing pulse synthesizer 324 with horizontal drive pulses used to recreate horizontal synchronizing pulses and with the vertical drive pulse being applied to a variable delay circuit therein so that the phase of the vertical synchronizing component may be varied over a range of one field of greater, thus allowing compensation for phase differences in video memory means and the phase of the information contained in the narrow band video input. These synchronizing signals added to the output of video memory circuitry 312 in mixer 326 provide a composite real time video signal output at point 328.

Figure 7:
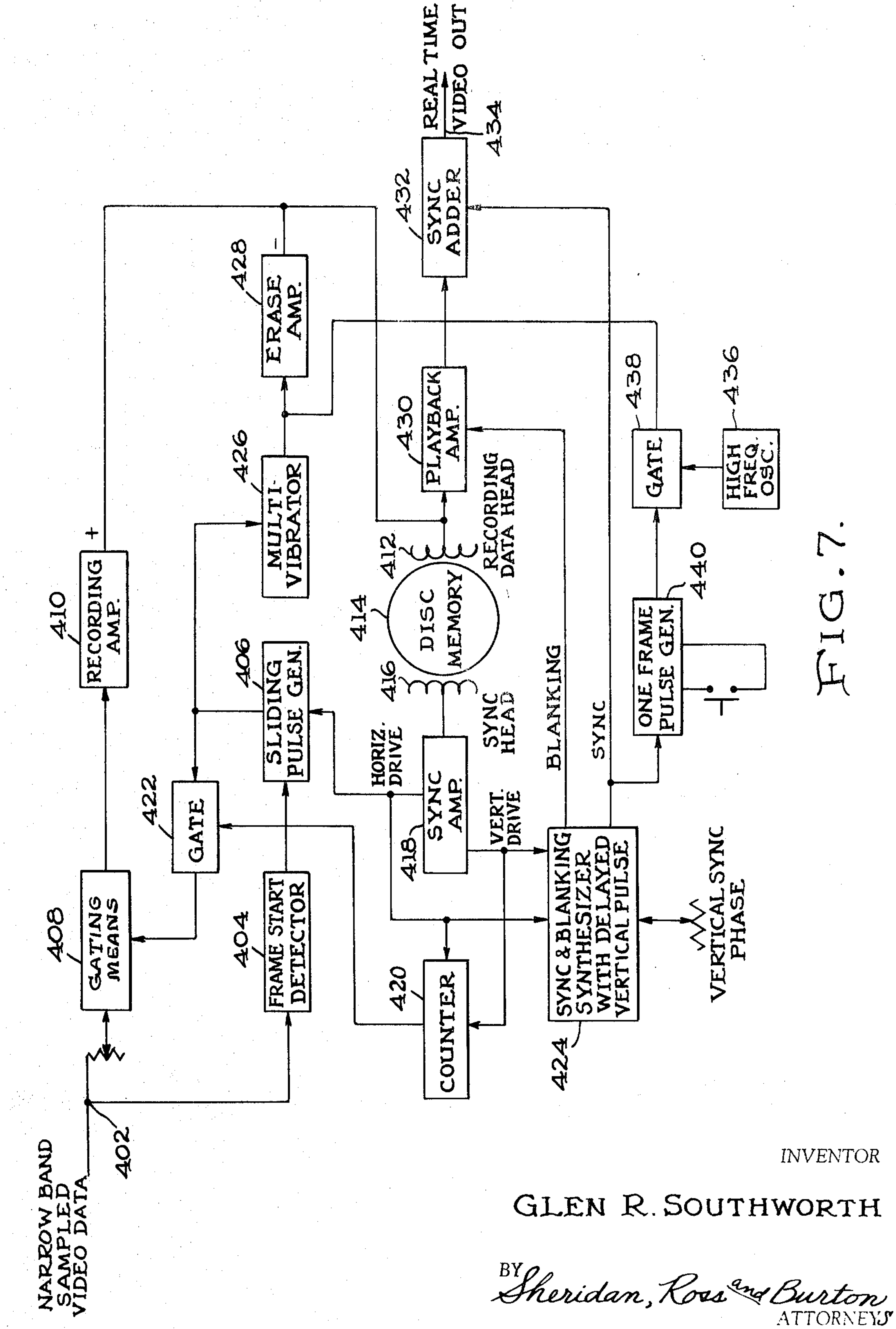
FIG. 7 is a block diagram of a second embodiment of a receiving converter for translating narrow band video signals to real time video signals.

In FIG. 7 there is illustrated another embodiment of a receiving scan converter for changing narrow band video to a real time television signal, this one using a magnetic disc memory and showing a more specific implementation of the embodiment of FIG. 6. In this case the narrow band sampled video data signal is applied to two circuits. The narrow band signal at point 402 is fed to frame start detector circuit 404 which actuates sliding pulse generator 406. The narrow band signal at point 402 also feeds gating means 408, gating means 408 being driven by gated pulses obtained by the output of counter 420 gating pulses from sliding pulse generator 406 in gating circuit 422 and which in turn drives recording amplifier 410 feeding one or more recording data heads 412 associated with disc memory 414. A second and additional head designated as synchronizing head 416 is associated with disc memory 414 and is used to reproduce a prerecorded television synchronizing signal, with the output of head 416 being amplified in synchronizing signal amplifier 418. The outputs of amplifier 418 are horizontal and vertical drive signals recovered as components of the synchronizing signal from head 416. The horizontal drive signal is used to actuate sliding pulse generator 406 and also counter 420, which is a counter identical to the counter which is used in the transmitting scan converter in the system, while both horizontal and vertical drive signals are applied to synchronizing pulse synthesizer 424 with horizontal drive pulses used to recreate horizontal synchronizing pulses and with the vertical drive pulse being applied to a variable delay circuit so that the phase of the vertical synchronizing component in the composite output may be varied over a range of one field or greater, thus allowing compensation for variations in the mechanical phase of disc memory 414, as compared to the electrical phase of the information contained in the narrow band video input. This is thus a means of achieving vertical registry in a television monitor connected to the output at point 434.

In the present embodiment, erasure of old information is automatically achieved by using a pulse from the output of sliding pulse generator 406 to trigger a one-shot multivibrator 426 which may have a period of approximately 1 microsecond. This pulse supplied to erasing amplifier 428 occurs prior to the recording pulse and provides erasure of earlier information, but is relatively narrow and does not delete all of the prior information until the new data is recorded, thus giving the appearance on the television monitor of a new image wiping off the previous one. Recording amplifier 410 and erasing amplifier 428 may be DC coupled with a negative pulse output being used for erasure and a positive pulse output for recording, or vice versa. The circuitry is arranged so that playback amplifier 430 is directly connected to recording data head 412, and simultaneously recovers the recorded video even during the recording process. The synchronizing signals from synthesizer 424 are added to the output of playback amplifier 430 in synchronizing adder circuit 432 to provide a composite real time video signal output at point 434.

Since disc memory 414 is a mechanically driven rotating element, some means of synchronizing the rotation rate to the incoming video signal must be used. This is readily accomplished by a variety of means, such as using a hysteresis synchronous motor drive driven by an appropriate frequency, or by utilizing some form of servo mechanism.

In this implementation of the embodiment of FIG. 7, a recording on the disc memory 414 is accomplished by means of laying down a series of pulses over a period of time. If these pulses are spaced too closely together, they fall outside of the capabilities of disc memory 414 and no synthetic "carrier" will be produced, with the result that the real time video output signal at point 434 will lack grey scale and contain only high frequency signal transitions, being similar in appearance to a highly differentiated real time video signal. If amplitude modulation is utilized during the recording process and the magnetic material of disc memory 414 has a reasonably linear transfer characteristic, then grey scale information may be recovered by partial erasure of the compacted video data in disc memory 414. This is done here by gating the output of high frequency oscillator 436 in gating circuit 438 with the output of one-frame pulse generator 440. Oscillator 436 is thus gated to release a high frequency burst so that a modulated erase voltage of proper frequency occurs only for one single frame, thus preventing overlap and possible destructive additional erasure during subsequent frames. In essence, this process also creates a high frequency carrier in the playback of disc memory 414.

Figure 8:
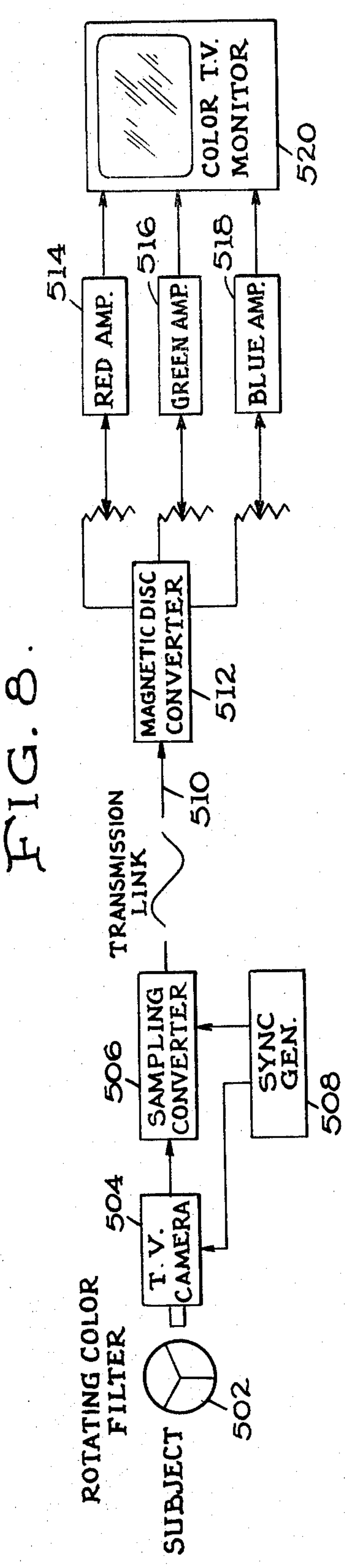
FIG. 8 is a block diagram of a color transmission system utilizing narrow bandwidth transmission.

An additional embodiment of the invention which is suitable for the reproduction of color television signals is shown in FIG. 8. In this case a series of red, blue, and green filters are placed sequentially in front of the lens of monochrome television camera 504 with each filter being in place for the length of time required to transmit one frame of compressed video signal. In FIG. 8 a slowly rotating color filter 502 composed of the three colors stated above is shown. The camera signals are compressed in sampling converter 506 with synchronization of camera 504 and converter 506 provided by synchronizing generator 508.

An alternate arrangement is to take the red, blue and green outputs of a standard color television camera and sequentially switch the individual color channels to the input of the sampling converter, with each channel being connected for the length of time required to transmit one frame. A third version is to time-share the three channels from the color camera in such a manner that one "line" of red information is transmitted, followed by one "line" of green information, and then one "line" of blue information, thus producing a form of line sequential narrow band color video signal.

At the receiving terminal the techniques described earlier, such as in connection with FIG. 7, may be used with magnetic disc converter 512 having appropriate gating circuits so that red, green, and blue components of an input signal at point 510 can be recorded on three separate channels of a magnetic disc memory within converter 512. The outputs from these channels are then each amplified in respective amplifiers 514, 516, and 518 with their respective outputs being applied respectively to the red, green and blue inputs of a standard color television monitor 520. Similarly, when an appropriate time base is used in conjunction with the motor drive of the magnetic disc memory, the outputs of red, green and blue amplifiers 514, 516 and 518 may be reconverted into composite signals meeting the standards for such signals set by the National Television System Committee.

Figure 9:
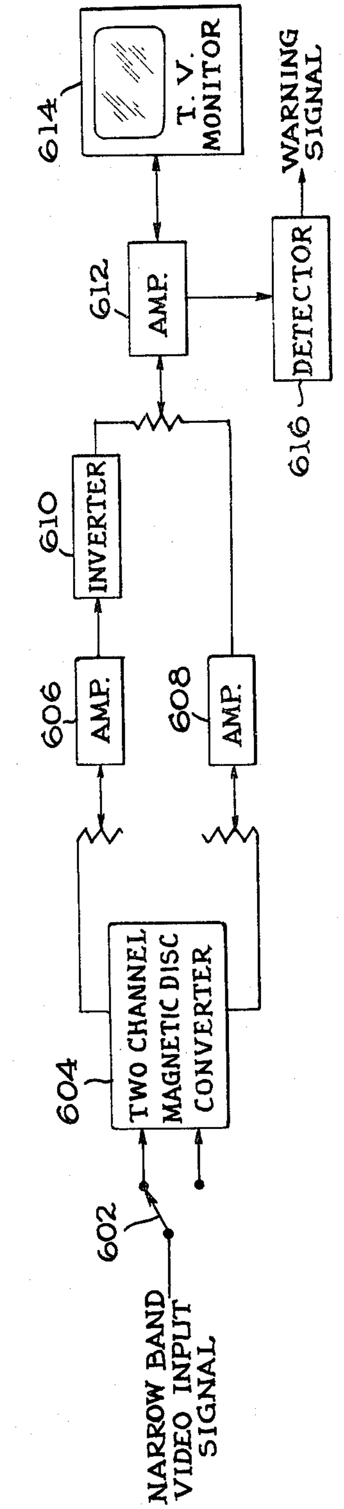
FIG. 9 is a block diagram of a receiving converter with means to automatically detect changes in succeeding frames of narrow band video.

As additional embodiment of the present invention is shown in FIG. 9 wherein a two channel magnetic disc converter 604 is used to detect changes in the incoming narrow band video signals, thus providing motion detection for surveillance or other purposes. In this embodiment a frame of incoming narrow band video signal is switched at switching circuitry 602, which is only depicted diagrammatically in the figure, for recording on one channel of converter 604 with the succeeding frame recorded on a second channel of converter 604. The playback signals through amplifiers 606 and 608 are then combined in amplifier 612 with the video polarity in one channel amplifier 606 being inverted in inverter 610 so that partial or full cancellation of the two video signals takes place. The end result of this process as seen on the screen of television monitor 614 is essentially a blank raster if no motion or change in video content occurs in the time interval between the two recordings. If a change does occur, it will be displayed on the television screen of monitor 614 as a relatively high contrast image. A video threshold detection circuit 616 may also be utilized by connection, for example, to amplifier 612, to provide automatic warning of a discrepancy between the two recorded images when a non-cancelled signal appears in amplifier 612.

Figure 10:
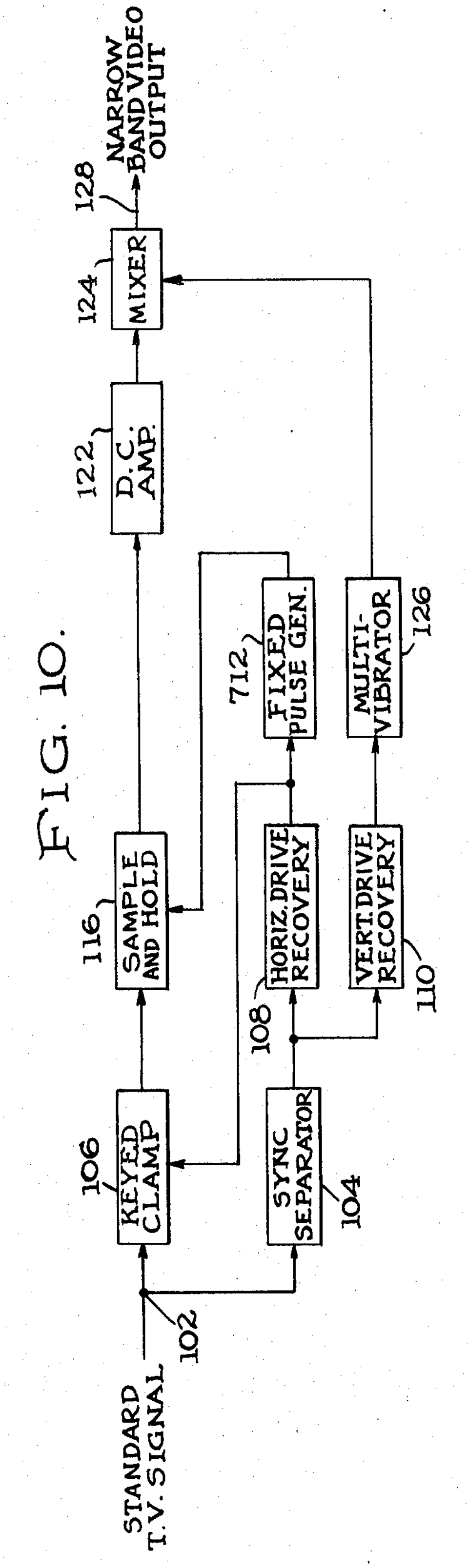
FIGS. 10 and 11 are block diagrams of additional embodiments of transmitting converters which cause only the object moving relative to the viewing camera to be shown on a television monitor connected at the output of the overall system.

Another embodiment which is useful for purposes of surveillance is shown in FIG. 10. This is a transmitting converter changing standard television signals to narrow band video output but transmitting parallel (horizontal or vertical) lines except in the case when something in the scene being scanned moves relative to the camera. This embodiment is important where surveillance of certain areas is involved and an observer is only concerned with movement occurring within the area under surveillance. For example, during after-hours in a store, it is common to have television cameras on closed circuit set up to transmit to a central location the scene within the store. The person monitoring the television screen may soon reach a point at which he does not readily detect movement. With the embodiment of FIG. 10, the signal being transmitted will show only the item which is moving relative to the camera viewing the scene and in which the viewer has an interest.

FIG. 10 operation is similar in many respects to that of FIG. 2 with the omission of counter, gate and pattern generator and with the substitution of a fixed pulse generator 712 instead of the sliding pulse generator 112 of FIG. 2. The preferred sampling in this embodiment is one sample taken every television line in a vertical row down the center of the picture. Alternatively, sampling may be along a diagonal row. Either motion of a person or object across the sampling row or, alternately, mechanical motion of the camera, itself, serves to produce "scanning" on the axis opposite to that of the sampling row as distinguished from the usage of the sliding pulse generator in the earlier embodiment.

In order not to repeat the explanation of operation, components in FIG. 10 which are similar to those in FIG. 2 have been similarly numbered. In this embodiment sample and hold circuit 116 is actuated by the pulses from fixed pulse generator 712 which in turn has been actuated only by horizontal drive signals from horizontal drive recovery circuit 108. This accounts for sampling taken every television line in either a vertical or diagonal row. Also, the narrow band video output signal at point 128 will likely have a bandwidth of 8 kHz.

Figure 11:
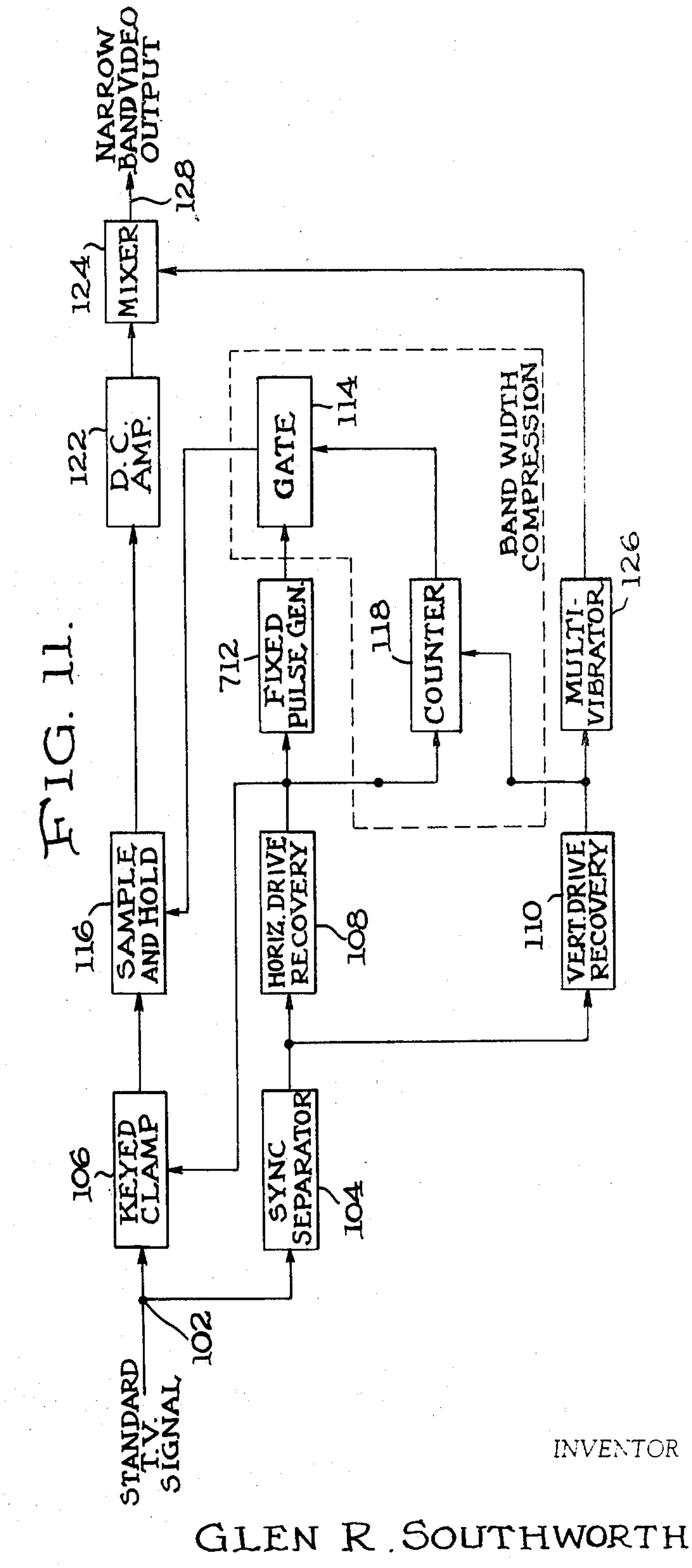

FIG. 11 is similar in its action and picture results except that counter 118 and gating circuit 114 have been placed back in the transmitting scan converter and therefore the narrow band video output signal at point 128 again has a reduced bandwidth as in the embodiment of FIG. 2. Thus with the embodiment of FIG. 11, the television camera has a wider choice of locations since the signal can be transmitted by a telephone line to a central, remotely located monitoring station as with the previous examples using bandwidth compression. Operation is as before described except for the use of a fixed pulse generator 712 in place of sliding pulse generator 112.

It will be obvious to those skilled in the art that variations in the overall system can be made using different embodiments of transmitting converters with the different embodiments of receiving converters within limits with consideration given to matching of their narrow band video output and input signals respectively and dependent upon the results desired.

What is claimed is:

1. A system for transmitting television signals for viewing subjects in motion relative to the camera comprising transmitting converter means to reduce a wide band television signal to a narrow band television signal, receiving converter means to detect relative motion and convert said narrow band television signal to a video signal applicable to a cathode ray tube, linking means carrying said narrow band television signal between said transmitting converter means and said receiving converter means, said receiving converter means including video memory means having two channels for receiving, recording and transmitting successive frames of video signals, switching means to successively connect each of said two channels to said linking means, signal inverting means connected to one of said two channel outputs, and signal combining means to cancel similar signals received from successive frames and pass difference signals to a receiver means, connected between the outputs of said inverting means, the other of said channel outputs, and the input of said receiver means.

2. The system in accordance with claim 1, further characterized by said receiver means including a threshold detection circuit means connected to said signal combining means to detect a discrepancy between successive recorded images from said two channels.

3. The system in accordance with claim 1, further characterized by said transmitting converter means including means to generate a series of sampling pulses, means for deleting certain ones of said sampling pulses, and means to sample and hold the wide band television signal in response to the remaining said sampling pulses to produce a series of samples.

4. The system in accordance with claim 3, further characterized by said linking means being a conventional telephone line, and said deleting means and sampling means producing the narrow band television signal of bandwidth acceptable to said linking means.

5. The system in accordance with claim 3, further characterized by said sampling means including sample pulse generating means actuated by a driving pulse synchronizing means synchronized with the wide band television signal, and said deleting means including counter means also actuated by said driving pulse means, and gating means connected with said sampling means and also connected to receive pulses from said sample pulse generating means and said counter means to delete selected numbers of pulses received from said sample pulse generating means.

6. The system in accordance with claim 5, further characterized by said sample pulse generating means being a sliding pulse generator.

7. The system in accordance with claim 5, further characterized by said sample pulse generating means being a fixed pulse generator.

8. The system in accordance with claim 3, further characterized by said sampling means including synchronizing pulse separator means to recover horizontal and vertical drive pulses from said wide band television signal, sample pulse generating means actuated by a drive pulse from said synchronizing pulse separator means;

said deletion means including counter means actuated by both horizontal and vertical drive pulses from said synchronizing pulse separator means, and gating means connected to receive pulses from said sample pulse generating means and said counter means to delete predetermined numbers of pulses received from said sample pulse generating means.

9. The system in accordance with claim 1, further characterized by said transmitting converter means including synchronizing pulse separator means to recover horizontal and vertical drive pulses from said wide band television signal, keying and clamping means also connected to receive said wide band television signals, fixed sample pulse generating means actuated by one kind of said drive pulses from said synchronizing pulse separator means, sample and hold circuit means connected to receive the output from said fixed sample pulse generating means, multivibrator means connected to receive the other kind of said drive pulses from said synchronizing pulse separator means, and mixing means to receive a keyed and clamped video signal through said sample and hold circuit means to produce a narrow band television signal.

10. The system in accordance with claim 1, further characterized by said transmitter converter means including means for generating a row of information sample pulses in fixed relation to the television signal horizontal timing rate, a fixed pulse generating means, means for deleting certain ones of said fixed pulses, and means responsive to the remaining fixed pulses for sampling said wide band television signal to produce said information sample pulses.

11. A system in accordance with claim 10, further characterized by said deleting means including gating means and counting means connected to receive pulses from said pulse generating means to delete selected number of pulses received from said pulse generating means.

12. A method for transmitting television signals for viewing subjects in motion relative to the camera comprising the steps of generating a row of sampling pulses by taking one sample from each television line, deleting a predetermined number of the sampling pulses thereby further compressing the bandwidth of the television signal, transmitting the remaining sampling pulses which have not been deleted in the form of a narrow band television signal to a remote receiver, and restoring said narrow band television signal to a signal applicable to a cathode ray tube, and restoring step including switching succeeding frames of said narrow band television signal into different channels, cancelling comparing a pair of separated frames from said different channels, and detecting discrepancies in said pair of frames.

13. A method of transmitting television signals for viewing subjects in motion relative to the camera comprising the steps of generating sampling pulses, deleting a predetermined number of said sampling pulses, sampling a wide band television signal utilizing the remaining ones of said sampling pulses, holding the amplitude levels of the samples used and transmitting them in the form of a narrow band television signal to a remote receiver location, and restoring said narrow band television signal to a signal applicable to a cathode ray tube, said restoring step including separating succeeding frames of said narrow band television signal, cancelling similar signals in a pair of separated frames, and detecting discrepancies in said pair of frames.

* * * * *